(12) United States Patent
Luchio

(10) Patent No.: US 7,816,003 B1
(45) Date of Patent: Oct. 19, 2010

(54) ADHESIVE FILM COMPOSITION

(75) Inventor: Steve Luchio, Chesterland, OH (US)

(73) Assignee: Arrowhead Coating and Converting, Inc., Cedar, MN (US)

(*) Notice: Subject to any disclaimer, the term of this patent is extended or adjusted under 35 U.S.C. 154(b) by 413 days.

(21) Appl. No.: 11/584,230

(22) Filed: Oct. 20, 2006

Related U.S. Application Data

(63) Continuation-in-part of application No. 10/325,498, filed on Dec. 19, 2002, now abandoned.

(60) Provisional application No. 60/341,965, filed on Dec. 19, 2001.

(51) Int. Cl.
*B32B 7/12* (2006.01)

(52) U.S. Cl. .............. 428/343; 428/355 R; 428/355 EN

(58) Field of Classification Search ........................ None
See application file for complete search history.

(56) References Cited

U.S. PATENT DOCUMENTS

| | | | |
|---|---|---|---|
| 3,741,253 A | 6/1973 | Brax et al. .................. 138/137 |
| 3,764,458 A | 10/1973 | Ziegel ......................... 161/190 |
| 3,843,576 A | 10/1974 | Parkinson ................... 524/510 |
| 3,900,635 A | 8/1975 | Funderburk, Jr. et al. ... 428/474 |
| 4,008,352 A | 2/1977 | Dawes et al. ................ 428/474 |
| 4,082,877 A | 4/1978 | Shadle ......................... 428/35 |
| 4,084,035 A | 4/1978 | Arpin et al. ................. 428/352 |
| 4,137,364 A | 1/1979 | Ball, III et al. .............. 428/412 |
| 4,243,568 A * | 1/1981 | Brown ......................... 524/562 |
| 4,247,563 A | 1/1981 | Sample ........................ 426/87 |
| 4,335,175 A | 6/1982 | Webb .......................... 428/213 |
| 4,387,172 A | 6/1983 | Agarwal et al. ............... 524/60 |
| 4,544,699 A | 10/1985 | Biale .......................... 524/512 |
| 4,600,616 A | 7/1986 | Ohya et al. ................. 428/34.9 |
| 4,604,768 A | 8/1986 | Goldfarb ..................... 16/86 A |
| 4,631,235 A | 12/1986 | Biale .......................... 428/518 |
| 4,708,896 A | 11/1987 | Akao .......................... 428/34.3 |
| 4,716,085 A | 12/1987 | Biale ....................... 428/476.9 |
| 4,784,906 A | 11/1988 | Akao .......................... 428/324 |
| 4,894,264 A | 1/1990 | Akao et al. ................. 428/34.2 |
| 4,911,477 A | 3/1990 | Shishido ..................... 283/100 |
| 4,912,103 A | 3/1990 | Sibbach et al. .............. 428/215 |
| 4,956,212 A | 9/1990 | Bekele ....................... 428/36.6 |
| 5,244,950 A | 9/1993 | Schlarb et al. .............. 524/114 |
| 5,356,677 A * | 10/1994 | Meilhon et al. ............ 428/34.9 |
| 5,516,850 A | 5/1996 | Klauck et al. ............. 525/329.5 |
| 5,763,062 A | 6/1998 | Smith et al. ................. 425/215 |
| 5,776,751 A | 7/1998 | Boulton et al. .............. 435/194 |
| 5,824,415 A | 10/1998 | Kanki et al. .............. 428/411.1 |
| 5,905,099 A | 5/1999 | Everaerts et al. ............ 522/126 |
| 6,110,570 A | 8/2000 | Paleari et al. ................ 428/213 |
| 6,207,761 B1 | 3/2001 | Smith et al. ................. 525/221 |

FOREIGN PATENT DOCUMENTS

EP        342477 A1 *  11/1989

OTHER PUBLICATIONS

Henderson, Alex M., Ethylene-Vinyl Acetate (EVA) Copolymers: A General Review, IEEE Electrical Insulation Magazine, Jan./Feb. 1993-vol. 9 No. 1, pp. 30-38.*

\* cited by examiner

*Primary Examiner*—Jennifer C McNeil
*Assistant Examiner*—Adam C Krupicka
(74) *Attorney, Agent, or Firm*—Moss & Barnett

(57) ABSTRACT

The present invention includes a translucent, heat-activated, water-based adhesive composition that contains water and an ethylene vinyl acetate copolymer for use with polymeric films like ionic films. The present invention further includes a method of preparing an adhesive film composition that includes the translucent, heat-activated water-based adhesive composition coated onto the polymeric film, and a method of bonding the adhesive film composition to a bonding surface.

20 Claims, 1 Drawing Sheet

ADHESIVE FILM COMPOSITION

CROSS-REFERENCE TO RELATED APPLICATION(S)

The present application is a continuation-in-part application of application Ser. No. 10/325,498 filed on Dec. 19, 2002 and entitled "ADHESIVE FILM COMPOSITION" which is a non-provisional application that claims priority from Application Ser. No. 60/341,965 filed on Dec. 19, 2001 entitled "ADHESIVE FILM COMPOSITION by Steve Luchio all of which are incorporated herein in their entirety.

BACKGROUND OF THE INVENTION

The present invention generally relates to a translucent adhesive film composition.

The market for polymer films is enormous and is continually growing with a major component of that market being for packaging. Exceptional difficulties have been encountered in applying conventional adhesives to polymeric films, and in particular ionic films. Ionic films may be characterized as hydrophobic films having a polyethylene backbone to which carboxylic acid groups are attached. The carboxylic acid groups may be partially or completely neutralized with metal ions. During application of an adhesive to the ionic film, incomplete coverage of the ionic film by the adhesive typically occurs since the metal ions on the surface of the ionic film may prevent wetting by the adhesive. Incomplete coverage of the ionic film by the adhesive may impair adhesion of the ionic film to a surface, for example. In addition, incomplete coverage may promote undesirable delamination of the ionic film from the bonding surface after a certain period of time has elapsed.

Furthermore, use of special techniques and/or equipment may be required during application of the adhesive to the ionic film. As an example, the adhesive may require heating to very high temperatures or application using high pressures in order to obtain a substantially adhesive bond between the ionic film and the bonding surface. Alternatively, the adhesive may require application via costly specialized equipment like co-extrusion equipment.

Even more problematic to printing and packaging professionals is using ionic films to package items, such as food, medical devices or the like that require highly transparent and translucent packaging. Optical properties of polymer films, such as haze, transparency, clarity and transmittance are key issues in packaging applications, since they allow the consumer to see what is contained within the package. Hence the optical properties are important features in the marketability of a particular product.

Most conventional adhesives used on ionic films cause an undesirable chalky appearance in the packaged item since conventional adhesives are derived from polymeric components that have been coalesced prior to coating or polymeric materials having molecular weights of more than about 100,000 daltons which produces adhesive films with light transmission values of less than about 40%. In other cases, the adhesive may create blotches of chalkiness throughout the packaging to further reduce the attractiveness of the packaged item.

In an attempt to ameliorate the chalky appearance, printing and packaging professionals developed a method of coating an adhesive onto a bonding surface prior to adhesion to the ionic film using a vacuum-based process. Unfortunately, coating the bonding surface may partially or completely occlude any pores located in the bonding surface. Partial or complete occlusion of pores located in the bonding surface generally decreases a porosity of the bonding surface. Decreasing the porosity causes an increase in vacuum cycle time required for pulling the ionic film to the bonding surface during the vacuum-based adhesion process. Therefore, coating the adhesive onto the bonding surface prior to adhesion to the ionic film may increase the vacuum cycle time and thus, increase costs.

BRIEF SUMMARY OF THE INVENTION

The present invention includes a translucent adhesive film that contains a film substrate derived from an ionic copolymer that is coated with an adhesive composition. The adhesive composition contains an ethylene vinyl acetate copolymer having a molecular weight of less than about 4000 daltons and the adhesive film has an optical clarity of more than about 40%.

DETAILED DESCRIPTION

Figure 1:
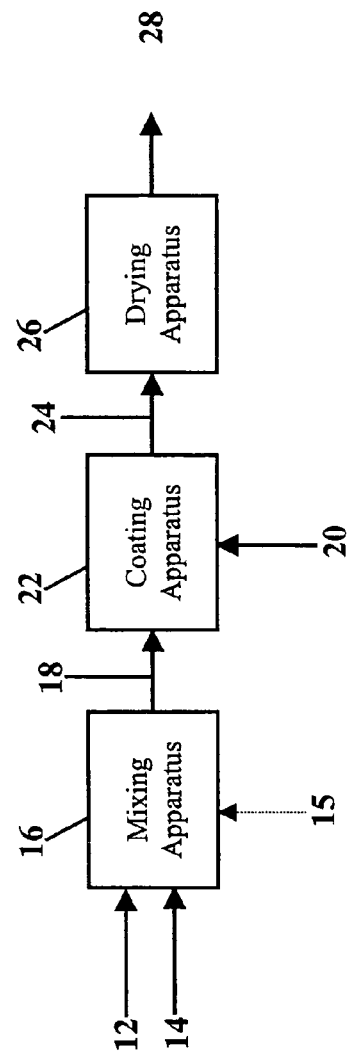
FIG. 1 is a schematic of a process for producing an adhesive film composition in accordance with the present invention.

A process for producing a heat-activated adhesive film composition is generally depicted at 10 in FIG. 1. In the process 10, a polymer composition 12, an aqueous composition 14, and any optional additive(s) 15 are introduced into a mixing apparatus 16 and are homogeneously blended together in the mixing apparatus 16 to form an adhesive composition 18.

After blending, the adhesive composition 18 and a film substrate 20 are transferred into a coating apparatus 22. The adhesive composition 18 is subjected to conditions in the coating apparatus 22 that initiates at least partial deposition of the adhesive composition 18 onto a surface (not shown) of the film substrate 20. Deposition of the adhesive composition 18 may proceed until an entire surface of the film substrate 20 is covered by the adhesive composition 18 to form a coated adhesive film composition 24.

Figure 2:
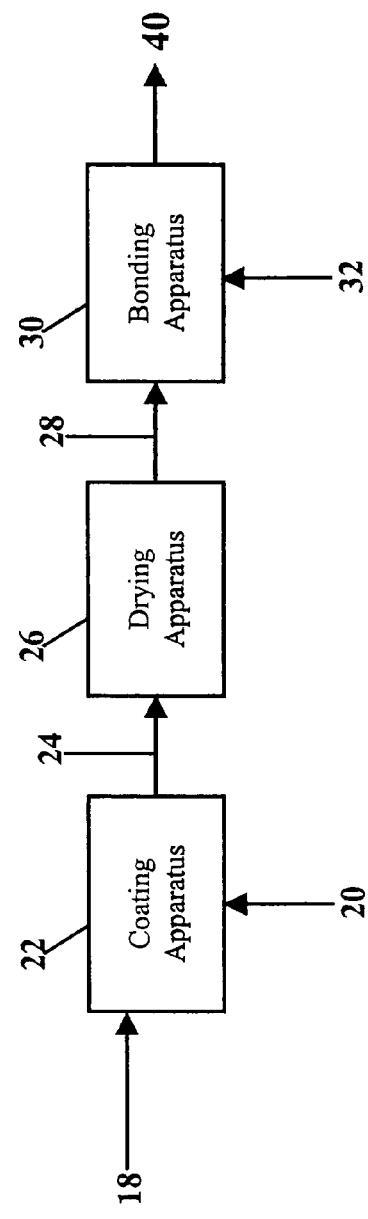
FIG. 2 is a schematic of a process for bonding an adhesive film composition to a bonding surface in accordance with the present invention. esent invention.

After coating the adhesive composition 18 onto the film substrate 20, the coated adhesive composition 24 may be dried in or during transport to a drying apparatus 26 to form an adhesive film composition 28 with a light transmission value of more than about 40% as measured by ASTM D-1003 entitled "Standard Test Method for Haze and Light Transmittance of Transparent Plastics". After drying, the adhesive film composition 28 may be transferred to a bonding apparatus 30 that bonds the adhesive film composition 28 onto a surface (not shown) of a bonding substrate 32 as best depicted in FIG. 2. As an alternative, an item (not shown) may be interposed between the adhesive film composition 28 and the surface of the bonding substrate 32 prior to bonding, to partially, completely enclose or package the item (not shown) with the adhesive film composition 28 and form a packaged item (not shown).

It has been discovered that an adhesive composition that includes a low molecular weight ethylene vinyl acetate (EVA) copolymer may be used as a translucent adhesive for hydrophobic films like ionic films. The low molecular weight EVA copolymer contains EVA copolymer fragments having a molecular weight of less than about 4000 daltons. When the adhesive composition is used to coat an ionic film, the adhesive composition remains translucent on the ionic film even after heat-activation and bonding the adhesive film to a surface of a bonding substrate. Heat-activation of the adhesive composition causes the EVA copolymer fragments to coalesce or fuse together and form a higher molecular weight adhesive composition with increased optical clarity.

In general, conventional adhesives turn chalky when adhering ionic films to surfaces, such as porous printed paper surfaces because conventional adhesives use high molecular weight polymers. Chalkiness has limited previous utilization of translucent ionic films in packaging applications, particularly those applications that require translucent packaging films. By chalky is meant any film that has light transmission or optical clarity values of less than about 40% after correcting for light reflection losses as measured by ASTM D-1003 "Standard Test Method for Haze and Light Transmittance of Transparent Plastics". As used herein, the term "translucent" refers to a film that has light transmission or optical clarity values of more than about 40% after correcting for light reflection losses as measured by ASTM D-1003.

While not wanting to be bound to theory, it is believed that using a low molecular weight EVA copolymer that contains EVA copolymer fragments having a molecular weight of less than about 4000 daltons to coat an ionic film substrate can produce a translucent adhesive film that has an optical clarity of more than about 60% after heat-activated fusion of the polymer fragments. When the translucent adhesive film has an optical clarity of more than about 60%, the translucent film is capable of maximum light and/or color transmission. The terms "light transmission" or "optical clarity" are used interchangeably throughout the specification and refer to the degree of light that passes through a film as measured by ASTM D-1003.

Furthermore, the adhesive composition of the present invention is effective in bonding ionic films to surfaces without using special equipment and/or costly equipment. When the adhesive composition is coated onto the ionic film to form an adhesive ionic film, there is little if any decrease in optical clarity when the adhesive film is bonded to the surface of a printed cardboard paper. Thus, contrary to conventional adhesive films bonded to printed cardboard paper surfaces, the adhesive film of the present invention delivers exceptional optical clarity and maximum color transmission.

The polymer composition 12 that is used in accordance with the present invention generally includes one or more polymeric component(s) optionally dissolved or dispersed in one or more solvent(s). The polymeric component(s) typically have melting points that range from about 40° C. to about 350° C. Preferably, the melting point ranges from about 40° C. to about 200° C. to improve wetting and coverage by the adhesive composition 18 on the film substrate 20. Most preferably, the melting point ranges from about 40° C. to about 165° C. to maximize bonding of the adhesive composition 18 on the film substrate 20.

The polymeric component(s) that are included as part of the polymer composition 12 generally have a molecular weight that is less than about 4000 daltons when preparing the adhesive composition 18 of the present invention. Preferably, the molecular weight of the polymeric component(s) range from about 600 daltons to about 4000 daltons to attain optimal coverage of the adhesive composition 18 when practicing the present invention.

The polymeric component(s) generally have a glass transition temperature that ranges from about −65° C. to about 90° C. when preparing the adhesive composition 18 in accordance with the present invention. Preferably, the glass transition temperature ranges from about −60° C. to about 70° C. to enhance deposition of the adhesive composition 18 onto the film substrate 20.

Some non-exhaustive examples of polymeric materials that may be used to prepare the polymeric composition 12 in accordance with the present invention includes polymers of ethylene vinyl acetate (EVA), ethylene acrylic acid (EAA), methylene ethylene acrylic acid (MEAA), polyamide (PA), polyester (PE), ethylene vinyl acetate (EVA) ionomer, copolymers of ethylene vinyl acetate (EVA), ethylene acrylic acid (EAA), methylene ethylene acrylic acid (MEAA), polyamide (PA), polyester (PE), ethylene vinyl acetate (EVA) ionomer, or any combination of any of these. As used herein, the terms "copolymers of ethylene vinyl acetate" or "polymers of ethylene vinyl acetate" refer to polymeric materials that contains more than about 50% ethylene.

Preferably, the polymer composition 12 includes copolymers of EVA or EVA ionomer. Still more preferably, the polymer composition 12 contains an EVA copolymer having a molecular weight that is less than about 4000 daltons. Most preferably, the polymer composition 12 contains an EVA copolymer with a molecular weight that ranges from about 600 daltons to about 4000 daltons.

The polymeric material(s) that are used to form the polymer composition 12 may be supplied in resin form, as an emulsion, a film, a lacquer, a paste, or in granular form. Additionally, the polymeric material(s) may be supplied as individual polymers and/or monomers, or supplied in various prepared mixtures of two or more polymers and/or monomers that are subsequently combined to form the polymeric composition 12.

Furthermore, it is to be understood that the form of the polymeric material(s) that are used to form the polymer composition 12 may vary depending on the adhesive composition 18, the adhesive film composition 28, the coating technique or coating apparatus 22, the drying apparatus 26, the bonding apparatus 30, the bonding substrate 32, the item to be packaged using the adhesive film composition 28 or adhesive composition 18, or any combination of any of these.

When the preferred EVA copolymer is used to prepare the polymer composition 12, the concentration of ethylene vinyl acetate in the polymer composition 12 is generally more than about 75 weight percent of EVA copolymer, based on the total weight of the polymeric composition 12. Preferably, the EVA copolymer is more than about 85 weight percent, based on the total weight of the polymeric composition 12. Additionally, a solvent like toluene may be added to help dissolve and/or disperse the EVA copolymer when forming an emulsion. As an example, the EVA copolymer is more than about 95 weight percent, based on the total weight of the polymer composition 12, while the solvent accounts for less than about 0.5 weight percent, based on the total weight of the polymer composition 12.

When the preferred EVA copolymer is used in accordance with the present invention, the EVA copolymer generally includes an ethylene component and a vinyl acetate component. Typically, a concentration of the vinyl acetate component ranges from 0 weight percent to about 65 weight percent, based upon the total weight of the ethylene vinyl acetate copolymer. Preferably, the vinyl acetate component ranges from about 5 weight percent to about 45 weight percent, based upon the total weight of the ethyl vinyl acetate copolymer when practicing the present invention.

Though descriptions of the polymer composition 12 are primarily made in terms of the preferred EVA copolymer, it is to be understood that any other polymeric material having a molecular weight of less than about 4000 daltons and a melting point of less than about 200° C., such as polymeric materials derived from ethylene acrylic acid (EAA), methyl ethylene acrylic acid (MEAA), polyamide (PA), polyester (PE), or any combination of any of these, may be substituted in place of the preferred EVA copolymer in accordance with the present invention while still realizing benefits of the present invention.

Likewise, it is to be understood that any combination of the preferred EVA copolymer and any other polymeric material having a molecular weight of less than about 4000 daltons and a melting point of less than about 200° C. that is derived from ethylene acrylic acid (EAA), methyl ethylene acrylic acid (MEAA), polyamide (PA), polyester (PE) may be used in accordance with the present invention to attain desired properties of the adhesive film composition 28, while still realizing the benefits of the present invention.

As an example, a polymer composition 12 that includes an EVA copolymer having a molecular weight of less than about 4000 daltons may be blended with a polyamide or polyester with a melting point of less than about 200° C. in order to improve the durability of the resulting adhesive composition 18 for use in the garment industry. Similarly, two different types of EVA copolymers having different levels of vinyl acetate may be combined together in order to prepare an adhesive composition 18 that is more durable and less susceptible to degradation during production of the adhesive film composition 28. When the preferred EVA copolymer is blended with any other polymeric material to form the polymer composition 12, the blending ratio may be 0:100, 80:20, 20:80, 100:0, or any other ratio between 0 and 100 depending on the film substrate 20 or the bonding substrate 30.

An example of an EVA copolymer that may be used to prepare the polymer composition 12 when practicing the present invention is Adcote 37R972 that is available from Rohm and Haas of Philadelphia, Pa. Another suitable EVA copolymer is Adcote 37R345 that is also available from Rohm and Haas of Philadelphia, Pa. Preferably, Adcote 37R972 EVA copolymer that is available from Rohm and Haas of Philadelphia, Pa. is used to prepare the polymer composition 12 in accordance with the present invention. Additionally, blends of Adcote 37R972 and Adcote 37R345 at ratios ranging from 100:0 to 0:100, such as 90:10, 10:90, or 50:50 of Adcote 37R972 to Adcote 37R345 may be included as part of the adhesive composition 18 to adjust the durability of the resulting adhesive film composition 28 when practicing the present invention.

The polymer composition 12 may be mixed with the aqueous composition 14 as a liquid, vapor, lacquer, paste, or in granular form. The form of the polymer composition 12 that is selected preferably permits the polymer composition 12 to (1) remain stable prior to dissolving or dispersing into the aqueous composition 14, and (2) be homogeneously dispersed or dissolved into the aqueous composition 14.

The polymer composition 12 may be directly added to the first aqueous composition 14. As an alternative, the polymer composition 12 may be optionally dissolved or dispersed in one or more solvents, such as water, a nonpolar solvent, a polar solvent, or any combination of any of these prior to incorporation into the first aqueous composition 14. Various techniques for dispersing and/or solvating the polymeric material(s), such as the preferred EVA copolymer to form the polymer composition 12 are well within the knowledge of those of ordinary skill in the art, and therefore, are generally not described in detail herein.

The aqueous composition 14 may be included in the method of the present invention as a gel, liquid, or in vapor form. The form of the aqueous composition 14 that is selected preferably permits the aqueous composition 14 to (1) remain stable prior to dissolving or dispersing the polymer composition 12 or optional additive(s) 15, (2) homogeneously disperse the polymer composition 12, the aqueous composition 14, any optional additive(s) 15, (3) function as a continuous phase in an oil-in-water dispersion or emulsion, (4) not interfere with, or mask the functionality of the polymer composition 12, or (5) attain a desired solids concentration for subsequent deposition of the adhesive composition 18 onto the film substrate 20.

The aqueous composition 14 may include only water, or may optionally include additional solutes or solvents that do not interfere with forming the adhesive film composition 28 nor mask the functionality of the adhesive composition 18. Furthermore, those of ordinary skill in the art will recognize that an amount of the aqueous composition 14 that is used to prepare the adhesive composition 18 may vary depending upon the characteristics of the polymer composition 12, such as the molecular weight, vinyl acetate concentration, melt index, melting point, glass transition temperature, any optional additive(s) 15, coating or drying temperature, optional solutes or solvents, the desired coating thickness of the adhesive composition 18, or any desired characteristics of the adhesive composition 18 and/or the adhesive film composition 28.

The aqueous composition 14 may be supplied as an individual component or supplied in various prepared mixtures of two or more components that are subsequently combined to form the aqueous composition 14. Some non-exhaustive examples of the aqueous composition 14 include, but are not limited to, the above-mentioned water, nonpolar solvents, polar solvents, or any combination of any of these. Preferably, the aqueous composition 14 is water.

As an example, the aqueous composition may be more than about 35 weight percent of the adhesive composition 18. Preferably, the aqueous composition is more than about 45 weight percent of the adhesive composition. Still more preferably, the aqueous composition 14 is more than about 55 weight percent of the adhesive composition 18.

Additionally, higher amounts of water may included as part of the adhesive composition 18 to reduce solids or improve coat weight control, depending on the coating technique that is used to coat the adhesive composition 18 onto the film substrate 20. For example, the adhesive composition may include a range of about 12 weight percent to about 20 weight percent solids if a wire rod coating technique is used to coat the adhesive composition 18 onto the film substrate 20. Similarly, the adhesive composition 18 may include a range of about 6 weight percent to about 12 weight percent when using a gravure coating technique to coat the film substrate.

The polymer composition 12 may be added to the aqueous composition 14 or the aqueous composition 14 may be added to the polymer composition 12. While the order of addition of the polymer composition 12 and the aqueous composition 14 is not critical to the present invention, the adhesive composition 18 that is formed when the polymer composition 12 is dissolved or dispersed in the aqueous composition 14 is preferably capable of maintaining a homogeneous solution or dispersion in the adhesive composition 18.

The adhesive composition 18 may further include one or more optional additive(s) 15 that are compatible with, and that do not interfere with solvation and/or dispersion of the polymer composition 12 in the aqueous composition 14. Some non-exhaustive examples of optional components 15 include modifiers, tackifiers, defoamers, surfactants, emulsifiers, pigments, drying agents or the like.

For example, additives that are effective in increasing the mechanical stability of the preferred EVA copolymer may be added to the adhesive composition 18 prior to coating the film substrate 20. As an example, ammonia, potassium hydroxide, or ammonium hydroxide may be added to the adhesive composition 18 in an amount that increases the pH of the polymer composition 12 from a pH of about 6 to a pH of about 8.5 to about 10. Typically, less than about 0.0002 weight percent (or 2 ppm) ammonium hydroxide, based on the total weight of the adhesive composition 18, is added to prevent degradation of the preferred EVA copolymer particularly when the adhesive composition 18 is subjected to high shear conditions during the coating process.

Similarly, a defoaming agent like n-butanol maybe added to the adhesive composition 18 to reduce foaming. Preferably, less that about 0.5 weight percent (or 5000 parts per million) n-butanol is added to the adhesive composition 18 when practicing the present invention. Still more preferably, silica-based defoamers are avoided in the present invention since silica-based defoamers can interfere with the adhesive properties of the adhesive composition 18.

Likewise, isopropyl alcohol may be added to the adhesive composition 18 to improve drying and reduce the surface tension of the adhesive composition 18 that includes water. Reducing the surface tension of water increases the bond between the surface of the film substrate 20 and the adhesive composition 18 during preparation of the adhesive film composition 28. Isopropyl alcohol is also effective increasing the clarity and reducing the haze effect of the adhesive film composition 28.

The polymer composition 12, the aqueous composition 14 and any optional additives 15 are blended or mixed in the mixing apparatus 16. Furthermore, those of ordinary skill in the art will recognize that the amount of time and degree of agitation that is used to form the adhesive composition 18 in accordance with the present invention may vary depending on the characteristics of the polymer composition 12, the aqueous composition 14, any optional additive(s) 15, the film substrate 20, any process conditions of the coating apparatus 22, drying apparatus or bonding apparatus 30 like the temperature, pressure, humidity, residence time, or any combination of any of these. Preferably, the adhesive composition 18 is blended with low agitation rates in order to prevent bruising, degradation or breakdown of the polymeric material(s) in the adhesive composition 18.

Still more preferably, high speed dispersion equipment is avoided during mixing of the adhesive composition 18. High speed dispersion equipment typically operate at more than about 1000 RPM, and preferably at more than about 1500 RPM when mixing adhesives. Such high agitation is believed to destroy the adhesive composition 18 and degrade the polymeric material when practicing the present invention in a manner that eliminates most, if not all adhesion between the adhesive composition 18 and/or the adhesive film composition 28 and a bonding substrate. In general, any suitable mixing apparatus 16 like hand-mixers or low speed agitation mixers that operate at under 500 RPM, may be used to form the adhesive composition 18 when practicing the present invention.

The film substrate 20 may derived from one or more polymeric film material(s) containing polystyrene, polyethylene, polypropylene, polycarbonate, polyester, paper, cellulose, any synthetic paper substrate, any synthetic non-woven fabric, or any combination of any of these. The polymeric film material(s) that are used to form the film substrate 20 may be supplied in resin form, as an emulsion, a film, a lacquer, a paste, or in granular form. Additionally, the polymeric film material(s) may be supplied as individual polymers and/or monomers, or supplied in various prepared mixtures of two or more polymers and/or monomers that are subsequently combined to form the film substrate12.

Preferably, the film substrate 20 includes at least one ionic copolymer or ionic polymer on at least one surface of the film substrate 20. As used herein, the terms "ionic copolymer" or "ionic polymer" refer to a polymer that contains one or more ionic groups. In addition, the terms "ionic copolymer" or "ionic polymer" are used interchangeably throughout the detailed description.

Still more preferably, the film substrate 20 containing the preferred ionic copolymer typically includes at least one alpha-olefin backbone polymer to which at least one alpha, beta-ethylenically unsaturated acid is attached. The film substrate 20 used in accordance with the present invention may be a single-layer, or may include two or more laminate layers adhered together, such that at least one exterior surface of the film substrate 20 contains the ionic copolymer.

Some non-exhaustive examples of suitable alpha-olefins polymers that may be used to form the alpha-olefin backbone polymer of the film substrate 20 include ethylene, propylene, 1-butene, 1-pentene, 1-hexene, 1-heptene, 1-methylbutene-5, 4-methylpentene-1, ethylene, propolyene, 1-butene, 1-pentene, 1-hexene, 1-octene, 1-decene, 5-methyl-1-nonene, 5,5 dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,6,6-trimethyl-1-heptene, 1-dodecene, and 1-octadecene, 1,4-hexadiene, 1,9-octadecadiene, 6-methyl-1,5-heptadiene, 7-methyl-1,6 octadiene, 7-ethyl-1,7-nonadiene, 8-propyl-1,8-undecadiene, 8-ethyl-1,8-decadiene, 10-ethyl-1,9-docadiene, 12-ethyl-1,12-tetradecadiene, 13-n-butyl-1,12-heptadecadiene, 15-ethyl-1,15-heptadecadiene, di-cyclopentadiene, tri-cylopentadiene, tetra-cylcopentatdiene, 5-alkenyl-substituted 2-norbornene, 5-methylene-2-norbornene, 2-alkyl-2,5-norbornadienes, 5-ethylidene-2-norbornene, or any combination of any of these. Although alpha-olefins having higher carbon numbers that those listed above may be employed in the present invention, such materials may be not be readily available. Preferably, the alpha-olefin includes polymers of ethylene or copolymers of ethylene like linear low density polyethylene or polyethylene.

The concentration of the alpha-olefin may range from about 10 weight percent to more than about 90 weight percent, based upon the total weight of the film substrate 20. Preferably, the concentration of the alpha-olefin is greater than about 80 weight percent, based upon the total weight of the film substrate 20.

The alpha, beta-ethylenically unsaturated mono-carboxylic acid group is located in the alpha-olefin polymer backbone of the film substrate 20. Alternatively, the film substrate 20 may include an alpha, beta-ethylenically unsaturated di-carboxylic acid group in place of, or in addition to the mono-carboxylic acid group. The carboxylic acid group may be derived from carboxylic acids that contain about 3 to about 8 carbon atoms.

Some non-exhaustive examples of suitable mono-carboxylic or di-carboxylic acid groups that may be used as part of the film substrate 20 include acrylic acid, methacrylic acid, ethacrylic acid, itaconic acid, maleic acid, fumaric acid, monoesters of dicarboxylic acids like methyl hydrogen maleate, methyl hydrogen fumarate, ethyl hydrogen fumarate, and/or maleic anhydride. Although maleic anhydride is not a carboxylic acid in that it has no hydrogen attached to the carboxyl groups, it may be considered an acid for the purposes of the present invention because its chemical reactivity is similar to that of an acid. The carboxylic acid groups may be uniformly or randomly distributed in the alpha-olefin polymer backbone.

The concentration of the alpha, beta-ethylenically unsaturated carboxylic acid groups may range from about 0.2 weight percent to about 50 weight percent, based upon the total weight of the film substrate 20. Preferably, the concentration of the carboxylic acid group ranges from about 1 weight percent to about 25 weight percent, based upon the total weight of the film substrate 20.

In addition, ionic copolymers typically undergo reaction of the carboxylic acid group with an ionizable metal compound. The reaction may be referred to as "neutralization" and generally serves to cross-link two or more polymer chains derived from the alpha-olefin groups that are used in accordance with the present invention. Therefore, ionic copolymers may be characterized as possessing an ionic attraction between the ionizable metal compound and one or more ionized carboxylic acid groups.

As used herein, the term "ionizable metal compound" refers to a metal compound having one or more ionized valance states. Ionized metal compounds that may be used to neutralize the ionic copolymer may be delivered in the form of an uncomplexed metal ion and/or complexed metal ion. The complexed metal ion may have the general formula $Me^{+n}X_m$, where n is the ionic charge and is at least one, X is a nonionized group and n+m equals the valence of the metal. Preferably, the complexed metal ions are those in which all but one metal valence is complexed and one metal valence is readily ionized. For example, mixed salts of very weak acids, such as oleic acid or stearic acid, along with ionizable acids, like formic and acetic acids may be used to provide complexed metal ions when practicing the present invention. Other examples of complexed metal ions may include oxides, hydroxides, carbonates, sulfates, silicates, ethoxides, methoxides, nitrates, or bicarbonates, or any combination of any of these.

Some non-exhaustive examples of uncomplexed metal ions are mono-, di-, and trivalent ions of metal of Group I, II, III, IV-A, and VIII of the Periodic Table of Elements. As an example, suitable monovalent ions may include sodium, potassium, lithium, cesium, silver, mercury, copper, or any combination of any of these. Suitable divalent metal ions include beryllium, magnesium, calcium, strontium, barium, copper, mercury, tin, lead, iron, cobalt, nickel and zinc, or any combination of any of these. Suitable trivalent metal ions include aluminum, scandium, iron, and yttrium, or any combination of any of these. Preferably, the uncomplexed metal ion is an alkali metal. In addition, the film substrate 20 may be neutralized by two or more different metal ions having different valencies depending on the final properties of the film substrate 20.

The concentration of the ionized metal compounds may range from less than about 1 weight percent to more than about 50 weight percent of the total carboxylic acid groups that are present in the film substrate 20. Preferably, the ionized metal compound is mixed with the ionic copolymer in an amount that is sufficient to neutralize about 10 to about 90 weight percent of the carboxylic acid groups of the ionic copolymer when practicing the present invention.

Still more preferably, the carboxylic acid groups of the film substrate 20 that includes the preferred ionic copolymer undergo a degree of neutralization that is sufficient to form an effective number of cross-links to yield a molecular weight that is measurable by a melt index. Generally, the melt index of the film substrate 20 may range from about 1 to about 1000 grams per 10 minutes. Preferably, the melt index ranges from about 1 to about 100 grams per 10 minutes. As an example, the line of Surlyn® films that are manufactured by E.I. DuPont Nemours of Wilmington, Del. may be used as the film substrate 20 for the present invention. Alternatively, the film substrate 20 may include a blend of an ionic polymer combined with low density polyethylene or linear low density polyethylene that softens at temperatures above more than about 120° F. Preferably, Surlyn® films or resins are included as part of the film substrate 20 that is used in the present invention.

The film substrate 20 may have any desired thickness. Generally, the film substrate 20 may range from about 3 mils (about 0.07 millimeters (mm)) thick to about 20 mils (about 0.5 mm) thick when practicing the present invention, though thicknesses outside of this range are permissible. As an example, the thickness of the ionic film substrate 20 may be 5 mils, 7 mils, 10 mils or 20 mils. Typically, the heavier the item to be packaged, the thicker the film substrate 20 that is used.

The polymer composition 12, the aqueous composition 14 and any optional additives 15 may be blended to form a hot-melt composition, an emulsified composition or a solvent-based composition. Furthermore, it is to be understood that the form of the adhesive composition 18 that is used to prepare the adhesive film composition 28 will depend on the polymer composition 12, the aqueous composition 14, any optional additives 15, the film substrate 20, the coating apparatus 22, the adhesive film composition 28, the bonding apparatus 30, the bonding substrate 32, coating technique, coating weight or thickness, or the item to be packaged.

The adhesive composition 18 may be applied to the film substrate 20 by (1) spraying the adhesive composition 18 onto the film substrate 20 or an ionic film surface of the film substrate 20, (2) by contacting the surface of the film substrate 20 with the adhesive composition 18 such that the adhesive composition 18 coats the ionic film surface of the film substrate 20, (3) roller-coating or brushing the adhesive composition 18 as a melt solution or dispersion onto the film substrate 20 via direct-reverse coating, 3-roll reverse coating, or (4) or any other coating or application technique that is known in the art like slot die, extrusion, gravure, mayer rod, air knife, knife over roll, extrusion of the film substrate 20 along with the adhesive composition 18, in line-coating, or curtain coating.

Furthermore, it is to be understood that the coating technique that is used to apply the adhesive composition 18 to the film substrate 20 will vary and depend on the adhesive composition 18, the film substrate 20, the bonding apparatus 30, the bonding substrate 32, or the item to be packaged. As an example, the adhesive film composition 28 may be prepared by mixing an ionic copolymer resin with the preferred EVA copolymer included as part of the polymer composition 12 followed by blow-molding using a circular die, melt-extrusion using a T-die, or melt-extrusion coating.

The adhesive composition 18 is typically applied to the preferred film substrate 20 that includes the preferred ionic copolymer at temperatures that are less than the coalescing temperatures of the polymer composition 12 that includes the preferred EVA copolymer. When applying the adhesive composition 18 that includes the preferred EVA copolymer, the adhesive composition 18 is applied at temperatures of less than about 120° C. to maximize dimensional stability of the adhesive film composition 28. Preferably, the adhesive composition 18 is coated onto the film substrate 20 at temperatures ranging from about 40° C. to about 70° C. to prevent premature coalescing of the adhesive composition 18 in the coating apparatus 22.

The adhesive composition 18 may have any desired coating thickness. Generally, as the film substrate 20 containing the preferred ionic copolymer increases, the adhesive composition 18 coating thickness also increases. When the adhesive film composition 28 is used for skin packaging applications like covering an item located on a porous paper board, it has been found that the adhesive composition 18 may generally range from about 1 gram per square meter to about 30 grams per square meter though coating thicknesses outside of this range are permissible. Preferably, the coating thickness ranges from about 3 grams per square meter to about 15 per square meter. Most preferably, the coating thickness ranges from about 3 grams per square meter to about 10 grams per square meter when practicing the present invention.

Similarly, the coating thickness can range from about 0.005 mils to about 2.5 mils. Preferably, the coating thickness ranges from about 0.01 mils to about 1.5 mil when applying adhesive composition 18 that includes the preferred EVA copolymer. The adhesive composition 18 may be applied as a single layer or multiple layers. Additionally, the adhesive composition 18 may be applied to one or both surfaces of the film substrate 20.

After coating the adhesive composition 18 onto the film substrate 20, such as the film substrate 20 that includes the preferred ionic copolymer, the coated adhesive film composition 24 is dried in the drying apparatus 26 to form the adhesive film composition 28. Preferably, the coated adhesive composition 24 is dried at a temperature of less than about 150° F. to prevent premature coalescing or polymerization of the EVA copolymer in the adhesive composition 18. Still more preferably, the coated adhesive composition 24 is dried using air at a velocity of more than about 3500 cubic feet per minute (CFM) based upon standard conditions of 60° F. and 1 atmosphere of pressure in order to efficiently remove water from the adhesive composition 18 without polymerizing the preferred EVA copolymer. Most preferably, the coated adhesive composition 24 is dried at a temperature of less than about 150° F. and an air velocity of about 10,000 to about 15,000 CFM.

As an example, the coated adhesive composition 24 may be dried in a circulating oven like a gas-fired, air impingement oven, an infra-red (medium wave) air impingement oven or a radio frequency oven. In general, any suitable drying apparatus 26 that is effective in drying the coated adhesive film composition 24 without coalescing the adhesive composition 18 or destroying the adhesive properties of the adhesive composition 18 may be used in accordance with the present invention.

The adhesive film composition 28 is characterized as heat-activated. As used herein, the term "heat-activated" or "heat-activation" refers to an ability of a substance to develop adhesive properties upon heating. Heating the adhesive film composition 28 improves the flexibility or drawability of the adhesive film composition 28.

The light transmission or optical clarity of a dry adhesive film composition 28 having a coating thickness of about 0.005 mils to about 2.5 mils is at least about 40% prior to coalescence or heat-activation. Additionally, after heat-activation or coalescence, the optical clarity increases by at least 20 percentage points as measured by ASTM D-1003.

For example, when the adhesive film composition has a coating thickness of about 0.01 mils to about 1.5 mils, the optical clarity is about 44% after drying but prior to coalescence. The optical clarity of the adhesive film composition increases to more than about 69% after coalescence or heat activation. After bonding the adhesive film to the surface of color printed cardboard paper, the optical clarity of the adhesive film composition remains substantially the same as the optical clarity of the adhesive film composition prior to bonding.

While the adhesive composition preferably includes a low molecular weight EVA copolymer that has not undergone fusion to help operators identify the adhesive film, the adhesive composition can also be prepared by using an EVA copolymer that has undergone fusion when practicing the present invention to form a translucent adhesive film composition that has an optical clarity of more than about 65%.

The adhesive film composition 28 may be manufactured as a single layer or in multiple layers. Alternatively, the adhesive film composition may be prepared in resin form that is extruded onto the bonding substrate (not shown). Furthermore, it is to be understood that the adhesive film composition 28 may vary in form depending on the bonding substrate 32, the item to be packaged (not shown) or the bonding apparatus.

As used herein, the term "flexibility" (also sometimes referred to as "drapeability"), refers to the ability of the adhesive film composition 28 to bend easily. As used herein, the term "drawability" refers to the ability of the adhesive film composition 28 to be drawn or directed, by vacuum suction, for example, to conform to the surface of the bonding substrate. Improving the drawability or flexibility of the adhesive film composition 28 through heating permits the adhesive film composition 28 to flex, accommodate and support conformance of the adhesive film composition 28 to complex three-dimensional shapes that may be encountered during packaging of items having sharp edges or protruding surfaces. Improving the drawability of the adhesive film composition further enhances the degree to which the adhesive film composition 28 surrounds the item and eliminates most, if not all, dead space between the item and the bonding substrate 32.

The adhesive film composition 28 may be rolled-up and stored for future packaging needs. Alternatively, the adhesive film composition 28 may be directly transported to a bonding apparatus 30 that is effective to bond the adhesive film composition 28 to the surface of the bonding substrate 32.

The bonding apparatus 30 typically includes a heating device (not shown) that is effective to heat the adhesive film composition 28 to a temperature of more than about 120° F., and preferably more than about 180° F., and form a heated adhesive film composition (not shown). The temperature increase is also effective to soften and melt the adhesive film composition 28 prior to placing the adhesive film composition 28 on the bonding substrate 32, such as a porous paper board. The temperature increase also initiates at least partial coalescence of the preferred EVA copolymer. Coalescence of the preferred EVA copolymer typically proceeds until complete coalescence of the EVA copolymer occurs. In addition, coalescence of the preferred EVA copolymer does not change the transparency of the adhesive film composition 28.

The adhesive composition 18 typically coalesces or polymerizes at temperatures of more than about 85° C. when preparing the adhesive film composition 28. Preferably, the adhesive composition 18 initiates coalescing or polymerization at temperatures ranging from about 90° C. to about 120° C. and completes coalescence or polymerization in less than about 60 seconds. Still more preferably, the adhesive composition 18 initiates coalescence or polymerization at temperatures ranging from about 90° C. to about 120° C. and completes coalescence or polymerization to produce a clear adhesive composition within 15 seconds. Higher temperatures than the range of about 90° C. to about 120° C. may be used to coalesce the adhesive composition, such as temperatures of about 150° C., for example. If higher temperatures of more than about 120° C. are used to coalesce the adhesive composition 18, coalescence is completed in a shorter time period of about 5 seconds.

After heating the adhesive film composition 28 and coalescing the preferred EVA copolymer, the heated adhesive film composition is placed onto the surface of the bonding substrate 32. The heated adhesive film composition may be placed directly onto the surface of the bonding substrate 32 or directed by vacuum suction to the surface to bond the adhesive film composition 28 to the bonding substrate 32.

The bonding substrate 32 generally includes a plurality of pores, holes, or spaces (not shown) that extend partially or fully through the bonding substrate 32. As an example, the bonding substrate 32 may be porous paper, stiff paper card, corrugated pad, skin board, and/or a backing board which is porous or perforated so that a vacuum may be drawn directly through the backing board.

After placing the heated adhesive film composition onto the surface, the adhesive composition 18 flows in and adheres to the bonding substrate 32. As a result, the adhesive composition 18 and/or the adhesive film composition 28 may be present in, or may even fill, these pores, holes or spaces of the bonding substrate 32. Consequently, the adhesive film composition 28 may be, and is preferably integral with the bonding substrate 32, to collectively form the bonded product 40.

The adhesive film composition 28 may have any desired size. Generally, the adhesive film composition 28 is about 2 inches wider than a frame dimension of the bonding apparatus 30. As an example, a bonding apparatus 30 having a frame dimension of about 18 inches by about 24 inches would be capable of bonding an adhesive film composition 28 having a width of about 20 inches. Likewise, a bonding apparatus 30 having a frame dimension of about 24 inches by about 30 inches would be capable of bonding an adhesive film composition 28 having a width of about 26 inches. Additionally, a bonding apparatus 30 having a frame dimension of about 30 inches by about 36 inches is generally capable of bonding an adhesive film composition 28 having a width of about 32 inches. Furthermore, a bonding apparatus 30 having a frame dimension of about 30 inches by about 36 inches is generally capable of bonding an adhesive film composition 28 having a width of about 38 inches.

The bonding apparatus 30 may be any general vacuum sealer that is effective in vacuum drawing the adhesive film composition 28 to the bonding substrate 32. Alternatively, the bonding apparatus may be an extruder that is capable of depositing the adhesive film composition 28 onto the bonding substrate 32. Preferably, the bonding apparatus 30 is a vacuum sealer that bonds the adhesive film composition 28 to the bonding substrate 32. The conditions for bonding the adhesive film composition 28 to the bonding substrate 32 may be varied by adjusting the temperature, residence time of adhesive film composition 28 and bonding substrate 32, vacuum time, cool time or any combination of any of these. Such adjustments may also depend on the bonding substrate 32 or cardstock used, adhesive film thickness, item to be packaged, proximity of the item(s), and/or employees.

Preferably, the adhesive composition 18 and/or the adhesive film composition 28 is integral with the bonding substrate 32. The degree of adhesion between the adhesive composition 18 or the adhesive film composition 28 may be measured by fiber tear.

As used herein, the term "fiber tear" refers to a remnant, an amount of, or degree to which, one or more fibers from the surface of the bonding substrate 32 (not shown) remain on the adhesive film composition 28 after separating the adhesive film composition 28 from the surface of the bonding substrate 32. In addition, the term "fiber tear" indicates the bond between the adhesive film composition 28 and the bonding substrate 32 is greater than internal bonds or strength in the bonding substrate 32.

The adhesive film composition 28 of the present invention is able to provide good adhesion to bonding substrate 32, as indicated by fiber tear values ranging from about 100 to about 300 grams per about 25.4 millimeters. In fact, the adhesive film composition 28 of the present invention is able to create such a permanent bond with the bonding substrate 32 that a substantial destruction to the bonding substrate 32 or the packaging (not shown) is required in order to remove the adhesive film composition 28. Furthermore, if there is an item located between the adhesive film composition 28 and the bonding substrate 32, such as when the adhesive film composition 28 is used in packaging applications, the adhesive film composition 28 typically exhibits little, if any, bonding to the packaged item. Minimal bonding to the item permits minimal destruction to, and maximum protection of, the packaged item when practicing the present invention.

Another advantage of bonding the adhesive film composition 28 to a bonding substrate 32 is that a reduction in airflow through the bonding substrate 32 that occurs due to occlusion of any pores located in the bonding substrate 32 by the adhesive composition 18 is avoided. Therefore, airflow through the bonding substrate 32 that aids to direct the adhesive film composition 28 towards the bonding substrate is not reduced. Unobstructed air flow permits a reduction in a vacuum draw cycle and a vacuum time, such as up to about a 70 percent reduction in the vacuum draw cycle and/or vacuum time, based on an identical vacuum-based process that does not use the adhesive film composition 28 of the present invention. Furthermore, the adhesive film composition 28 is capable of bonding directly to the bonding substrate 32 rather to an item (not shown) that may be interposed between the adhesive film composition 28 and the bonding substrate 32 during a packaging application, for example.

Another benefit of using the adhesive film composition 28 that contains the preferred low molecular weight EVA copolymer is the degree of transparency provided by the adhesive film composition 28. When the adhesive composition 18 is applied to the film substrate 20 that contains the preferred ionic copolymer, the adhesive composition 18 is clear upon application. After coalescence occurs during the heating cycle using the bonding process, the adhesive composition 18 remains clear. Therefore, packaging applications that include products having sharp edges and protuberances will no longer be plagued with an unattractive unclear or chalky ring underneath the adhesive composition 18 or the adhesive film composition 28.

The adhesive film composition 28 also permits easy display of products to a customer by using simple hooks and/or peg boards to hang the product enclosed in packages from the adhesive film composition 28. In addition, when the adhesive film composition 28 is used to package delicate products onto corrugated pads, for example, manufacturers experience an added benefit of protection during shipping since the film substrate 20 that is used as part of the adhesive film composition 28 provides an impenetrable and chemically-resistant covering for delicate products.

As indicated above, the adhesive film composition 28 may be used to package an item placed onto a porous paper backing. In addition, the adhesive film composition 28 may function as a self-sealing tape useful for shipping applications, for example. The adhesive film composition 28 may also be used as a laminate. When the adhesive film composition 28 includes an ionic polymer like Surlyn®, the adhesive film composition 28 meets Food and Drug Administration (FDA) regulations for direct food and/or medical packaging under rule 176.

Although the present invention has been described with reference to preferred embodiments, workers skilled in the art will recognize that changes may be made in form and detail without departing from the spirit and scope of the invention.

The invention claimed is:

1. A translucent adhesive-coated film comprising:
   (a) a film substrate comprising an ionic copolymer;
   (b) an adhesive composition coated onto the film substrate, the adhesive composition comprising uncoalesced fragments of an ethylene vinyl acetate ("EVA") copolymer emulsion or a heat-activatable EVA copolymer, and having a molecular weight of about 600 daltons to about 4000 daltons; and
   (c) wherein the adhesive-coated film has a light transmittance of more than about 40%.

2. The adhesive-coated film of claim 1 wherein the ionic copolymer includes ions of zinc, magnesium, calcium, strontium, barium, titanium, tin, iron, cobalt, nickel, copper, zinc, chromium, aluminum, cadmium, sodium, hydrogen, lithium, potassium, calcium, or any combination of any of these.

3. The adhesive-coated film of claim 1 wherein the EVA copolymer uncoalesced fragments have a melting point of about 104° F. (40° C.) to about 329° F. (165° C.).

4. The adhesive-coated film of claim 1 wherein the film substrate has an adhesive composition coating weight of about 1 gram of adhesive composition per square meter of film substrate to about 30 grams of adhesive composition per square meter of film substrate.

5. The adhesive-coated film of claim 4 wherein the film substrate has an adhesive composition coating weight of about 3 grams of adhesive composition per square meter of film substrate to about 15 grams of adhesive composition per square meter of film substrate.

6. The adhesive-coated film of claim 1 further comprising a cardboard substrate adhered to the adhesive composition.

7. The adhesive-coated film of claim 1 wherein the film substrate has an adhesive composition coating thickness of about 0.005 to about 2.5 mils.

8. The adhesive-coated film of claim 1 wherein the film substrate has a thickness of about 5 mils to about 20 mils.

9. The adhesive-coated film of claim 1 wherein the adhesive composition comprises water at a concentration of about 35 weight percent or more, based on a total weight of the adhesive composition.

10. The adhesive-coated film of claim 1 wherein the uncoalesced fragments of adhesive composition coalesces at a temperature of more than about 185° F. (85° C.).

11. The adhesive-coated film of claim 1 wherein the ionic copolymer comprises at least one alpha-olefin backbone polymer to which at least one alpha, beta-ethylenically unsaturated acid is attached.

12. A skin packaged article made by the process comprising:
   (a) providing an article to be packaged;
   a bonding substrate against which the article is positioned; and
   a translucent adhesive-coated film, such translucent adhesive-coated film comprising:
      (i) a film substrate comprising an ionic copolymer;
      (ii) an adhesive composition coated onto the film substrate, the adhesive composition comprising uncoalesced fragments of an ethylene vinyl acetate ("EVA") copolymer emulsion or a heat-activatable EVA copolymer, and having a molecular weight of about 600 daltons to about 4000 daltons;
      (iii) wherein the adhesive-coated film has a light transmittance of more than about 40%;
   (b) wherein the adhesive-coated film is heated at a temperature of more than about 120° F. prior to placement of the adhesive-coated film around the article and onto the surface of the bonding substrate to soften and melt the adhesive film composition and initiate at least a partial coalescence of the uncoalesced fragments of EVA copolymer; and
   (c) wherein the heat-activated adhesive-coated film is drawn around the article to bond to the bonding substrate, and exhibits a light transmittance of more than about 60%, and does not bond to the packaged article.

13. The skin packaged article of claim 12, wherein the bonding substrate comprises a material selected from the group consisting of porous paper, stiff paper card, corrugated pad, skin board, or backing board.

14. The skin packaged article of claim 12, wherein the bonding substrate further comprises a plurality of pores, holes, or spaces extending partially or fully through the bonding substrate.

15. The skin packaged article of claim 12, wherein the uncoalesced fragments of EVA copolymer adhesive coalesce at a temperature of more than about 185° F. (85° C.).

16. The skin packaged article of claim 12 further comprising vacuum suction used to assist in drawing the heat-activated adhesive-coated film around the article to bond to the bonding substrate.

17. The skin packaged article of claim 12, wherein the film substrate is about 5 mils to about 20 mils thick.

18. The skin packaged article of claim 12, wherein the EVA copolymer uncoalesced fragments within the adhesive composition have a melting point of about 104° F. (40° C.) to about 329° F. (165° C.).

19. The skin packaged article of claim 12, wherein the film substrate has an adhesive composition coating weight of about 1 gram of adhesive composition per square meter of film substrate to about 30 grams of adhesive composition per square meter of film substrate.

20. The skin packaged article of claim 12, wherein the film substrate has an adhesive composition coating thickness of about 0.005 mils to about 2.5 mils.

* * * * *